(12) United States Patent　　(10) Patent No.:　US 12,676,937 B2

Kamada et al.　　(45) Date of Patent:　　Jul. 7, 2026

(54) PRINT MEDIUM SPECIFICATION METHOD AND PRINT MEDIUM SPECIFICATION SYSTEM

(71) Applicant: SEIKO EPSON CORPORATION, Tokyo (JP)

(72) Inventors: Takahiro Kamada, Matsumoto (JP); Mitsuhiro Yamashita, Matsumoto (JP); Takuya Ono, Shiojiri (JP); Yuko Yamamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 720 days.

(21) Appl. No.: 18/165,385

(22) Filed: Feb. 7, 2023

(65) Prior Publication Data

US 2023/0254428 A1　　Aug. 10, 2023

(30) Foreign Application Priority Data

Feb. 7, 2022　　(JP) ................................. 2022-017119

(51) Int. Cl.
　　*H04N 1/23*　　　　(2006.01)
　　*G06N 3/048*　　　(2023.01)

(52) U.S. Cl.
　　CPC ........... *H04N 1/2323* (2013.01); *G06N 3/048* (2023.01)

(58) Field of Classification Search
　　CPC .... H04N 1/2323; G06N 3/048; G06N 3/0464; G06N 3/09

USPC ......................................................... 382/112

See application file for complete search history.

(56)　　　　　　References Cited

U.S. PATENT DOCUMENTS

| | | | |
|---|---|---|---|
| 2019/0098142 A1 | 3/2019 | Ozawa | |
| 2019/0322476 A1 | 10/2019 | Miyazaki | |

FOREIGN PATENT DOCUMENTS

| | | | | |
|---|---|---|---|---|
| JP | 2006-154913 A | | 6/2006 | |
| JP | 2019-055554 A | | 4/2019 | |
| JP | 2019-188627 A | | 10/2019 | |
| JP | 2021059451 A | * | 4/2021 | |

* cited by examiner

*Primary Examiner* — Charlotte M Baker

(74) *Attorney, Agent, or Firm* — WORKMAN NYDEGGER

(57)　　　　　　ABSTRACT

An print medium specification method includes (a) step for acquiring first physical property information related to the print medium; (b) step for acquiring second physical property information different from the first physical property information related to the print medium; (c) step for acquiring a discrimination information for discriminating the type of the print medium by inputting the first physical property information to a discrimination function configured as a learned machine learning model; and (d) step for specify a type of the print medium using the discrimination information and the second physical property information not used for machine learning.

8 Claims, 8 Drawing Sheets

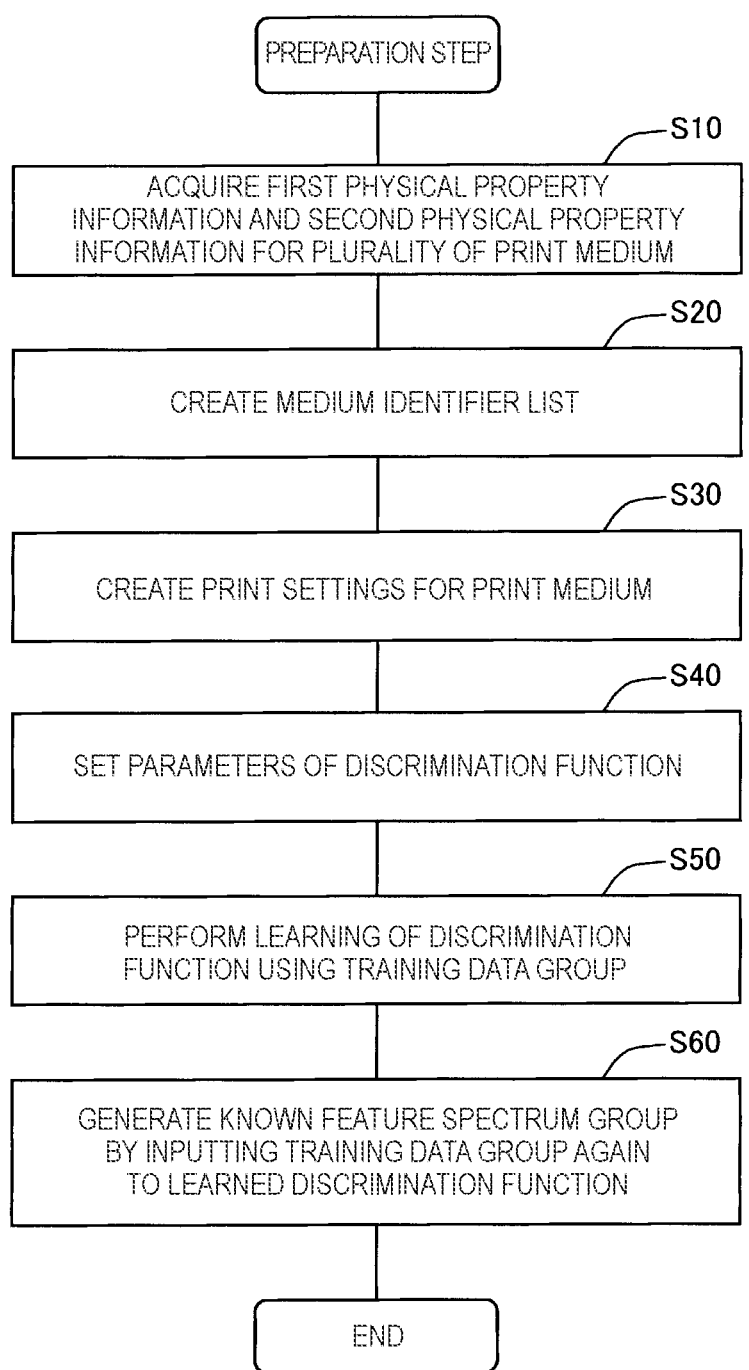

PREPARATION STEP

S10

ACQUIRE FIRST PHYSICAL PROPERTY
INFORMATION AND SECOND PHYSICAL PROPERTY
INFORMATION FOR PLURALITY OF PRINT MEDIUM

S20

CREATE MEDIUM IDENTIFIER LIST

S30

CREATE PRINT SETTINGS FOR PRINT MEDIUM

S40

SET PARAMETERS OF DISCRIMINATION FUNCTION

S50

PERFORM LEARNING OF DISCRIMINATION
FUNCTION USING TRAINING DATA GROUP

S60

GENERATE KNOWN FEATURE SPECTRUM GROUP
BY INPUTTING TRAINING DATA GROUP AGAIN
TO LEARNED DISCRIMINATION FUNCTION

END

FIG. 4

IDL

| MEDIUM IDENTIFIER | MEDIUM NAME | CLASS | DATA-SUB NO. | FIRST PHYSICAL PROPERTY INFORMATION R1 (λ) | SECOND PHYSICAL PROPERTY INFORMATION R2 (θ) |
|---|---|---|---|---|---|
| A-1 | MEDIUM 1 | 1 | 0 | ............... | ............... |
|  |  |  | 1 | ............... | ............... |
|  |  |  | 2 | ............... | ............... |
| A-2 | MEDIUM 2 | 2 | 0 | ............... | ............... |
|  |  |  | 1 | ............... | ............... |
|  |  |  | 2 | ............... | ............... |
| ... | ... | ... | ... | ............... | ............... |
| A-m | MEDIUM m | m | 0 | ............... | ............... |
|  |  |  | 1 | ............... | ............... |
|  |  |  | 2 | ............... | ............... |

FIG. 5

PST

| MEDIUM IDENTIFIER | PRINT SETTINGS | | |
|---|---|---|---|
|  | PRINTER PROFILE | MEDIUM FEED SPEED | DRYING TIME |
| A-1 | PR1 | FS1 | DT1 |
| A-2 | PR2 | FS2 | DT2 |
| ... | ... | ... | ... |
| ... | ... | ... | ... |
| A-m | PRm | FSm | STm |

FIG. 6

| No. | LAYER NAME | LABEL Lb | KNOWN FEATURE SPECTRUM KSp |
|---|---|---|---|
| 1 | ConvVN2 | 1 | ......................................... |
| 2 | ConvVN2 | 1 | ......................................... |
| ... | ... | ... | ......................................... |
| 1_max | ConvVN2 | 1 | ......................................... |
| 1 | ConvVN2 | 2 | ......................................... |
| 2 | ConvVN2 | 2 | ......................................... |
| ... | ... | ... | ......................................... |
| 2_max | ConvVN2 | 2 | ......................................... |
| ... | ... | ... | ......................................... |
| ... | ... | ... | ......................................... |
| m_max | ConvVN2 | m | ......................................... |

KS1

PRINT MEDIUM SPECIFICATION METHOD AND PRINT MEDIUM SPECIFICATION SYSTEM

The present application is based on, and claims priority from JP Application Serial Number 2022-017119, filed Feb. 7, 2022, the disclosure of which is hereby incorporated by reference herein in its entirety.

BACKGROUND

1. Technical Field

The present disclosure relates to a print medium specification method and a print medium specification system.

2. Related Art

JP-A-2021-59451 discloses a technology for discriminating a type of a recording medium. In the related technique, the type of the recording medium is discriminated by inputting a specular reflection light amount value, a diffuse reflection light amount value, a value related to the basis weight of a recording medium, and a value related to the thickness or density of the recording medium into a learned model for sheet type discrimination that has been subjected to machine learning.

However, in the related technique, when a large number of pieces of physical property information are used for learning of a discrimination function configured by a machine learning model, there is a problem in that it takes a large amount of time to learn the discrimination function.

SUMMARY

According to a first aspect of the present disclosure, a print medium specification method for specifying type of a print medium includes (a) step for acquiring first physical property information related to the print medium; (b) step for acquiring second physical property information different from the first physical property information related to the print medium; (c) step for acquiring discrimination information for discriminating the type of the print medium by inputting the first physical property information to a discrimination function configured as a learned machine learning model; and (d) step for specifying a type of the print medium using the discrimination information and the second physical property information not used for machine learning.

According to a second aspect of the present disclosure, a print medium specification system for executes medium specification process for specifying a type of a print medium includes a memory configured to store a discrimination function configured as a learned machine learning model and a processor configured to execute the medium specification process by using the discrimination function, wherein (a) process for acquiring first physical property information related to the print medium, (b) process for acquiring second physical property information different from the first physical property information related to the print medium, (c) process for inputting the first physical property information to the discrimination function to acquire discrimination information for discriminating a type of the print medium, (d) process for specifying the type of the print medium by using the discrimination information and the second physical property information, which is not used in machine learning.

BRIEF DESCRIPTION OF THE DRAWINGS

FIG. 4 is a flowchart showing a processing procedure of a preparation step.

FIG. 5 is an explanatory diagram showing a medium identifier list.

FIG. 6 is an explanatory diagram showing a print setting table.

DESCRIPTION OF EMBODIMENTS

Figure 1:
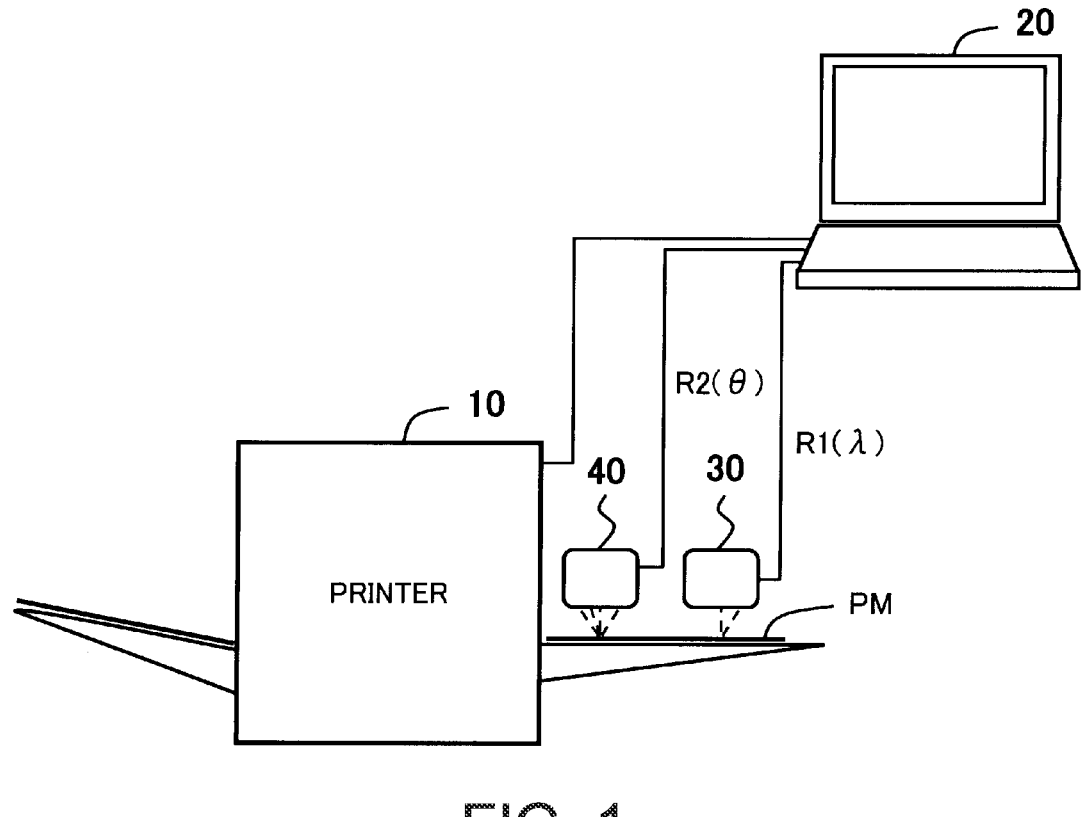
FIG. 1 is a block diagram of a printing system according to an embodiment.

FIG. 1 is a block diagram showing a printing system according to one embodiment. The printing system includes a printer 10, an information processing device 20, a spectral reflectance measuring device 30, and a reflectance distribution measuring device 40.

The spectral reflectance measuring device 30 performs spectral measurement on a print medium PM used in the printer 10 in an unprinted state, and acquires spectral reflectance $R1(\lambda)$ as first physical property information. The spectral reflectance $R1(\lambda)$ indicates the reflectance relating to a plurality of wavelengths A of reflected light that was incident on the surface of the print medium PM at one specific incident angle and that was reflected at one specific reflection angle. The reflectance distribution measuring device 40 measures the print medium PM used in the printer 10 in an unprinted state and acquires a reflectance distribution $R2(\theta)$ as second physical property information. The reflectance distribution $R2(\theta)$ indicates the reflectance of light that was incident on the print medium PM at one or more reflection angles and that was reflected at a plurality of reflection angles $\theta$ for each incident angle. In this embodiment, reflectance at a plurality of reflection angles is used for only one incident angle.

It is also possible to use other types of physical property information, other than the spectral reflectance $R1(\lambda)$ and the reflectance distribution $R2(\theta)$, as the first physical property information and the second physical property information on the print medium PM. For example, each of the first physical property information and the second physical property information may include one or more of a spectral reflectance, a spectral transmittance, a reflectance distribution, a captured image captured by a visible light camera, a thickness, an amount of water, a weight, a friction coefficient, and an ultrasonic inspection image. As the weight, it is preferable to use the weight per unit area. Since the captured image captured by a visible light camera represents the texture of the surface of the print medium PM, the type of the print medium PM can be specified according to the difference in texture. Further, since the ultrasonic inspection image represents the internal structure of the print medium PM, the type of the print medium PM can be specified according to the difference in the internal structure. By using such various types of physical property information, the type of the print medium PM can be specified according to various types of physical property information related to the print medium PM. When physical property information other than the spectral reflectance $R1(\lambda)$ and the reflectance distribution $R2(\theta)$ is used, a measuring device suitable for each is used. It is desirable that information represented by one value such as the thickness, the amount of water, the weight, the friction coefficient, and the like be combined with other information to constitute the first physical property information and the second physical property information from two or more kinds of information. However, the first physical property information and the second physical property information are configured as mutually different types of information. The meaning of "the first physical property information and the second physical property information are mutually different" is that least one type of information included in them is different.

As will be described later, the information processing device 20 acquires discrimination information for discriminating the type of print medium by inputting the spectral reflectance $R1(\lambda)$ of the print medium to the discrimination function, and specifies the type of the print medium PM using this discrimination information and the reflectance distribution $R2(\theta)$. The information processing device 20 further controls the printer 10 so as to execute printing under appropriate printing conditions according to the type of the specified print medium PM.

Figure 2:
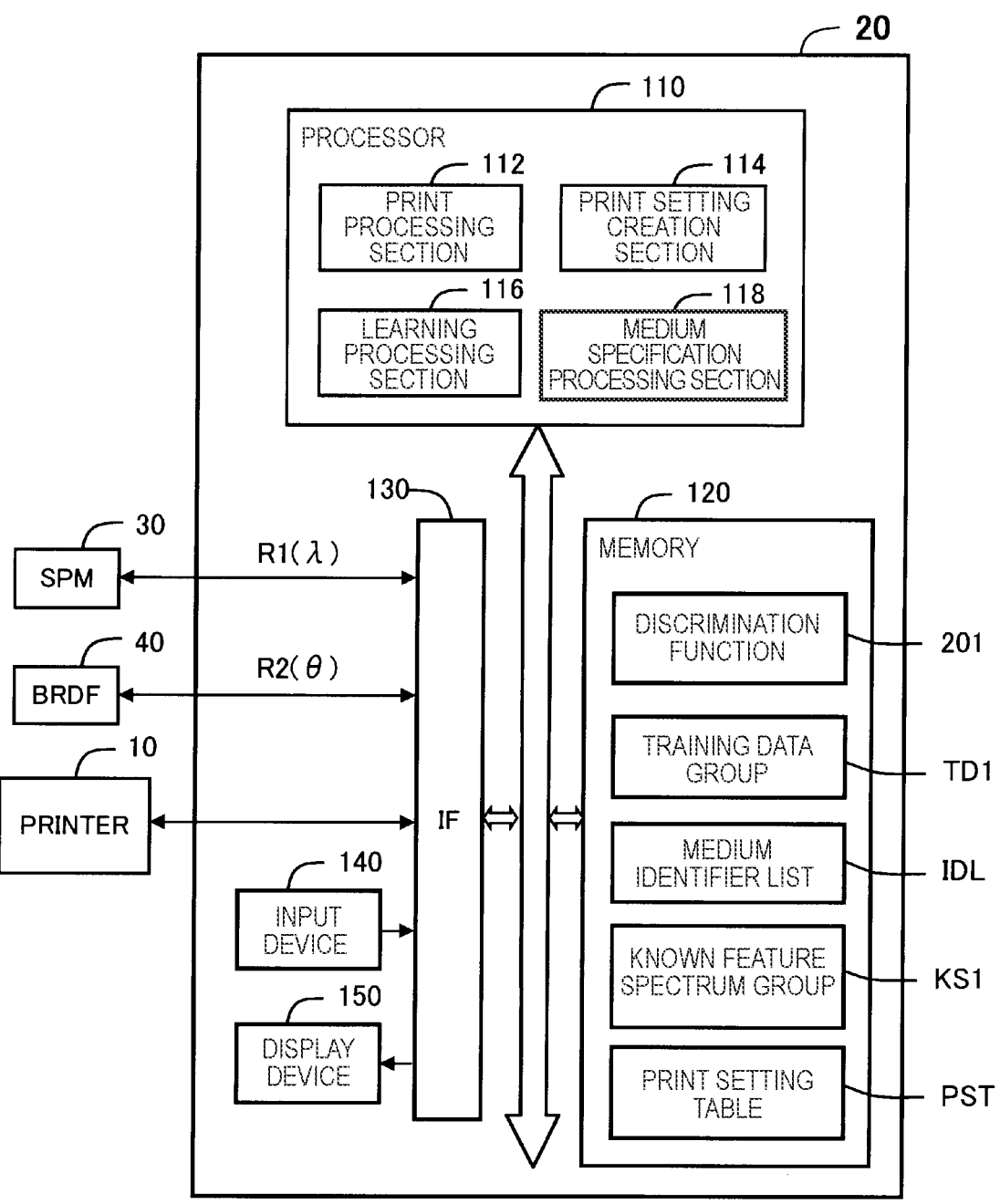
FIG. 2 is a block diagram of an information processing device.

FIG. 2 is a block diagram showing the functions of the information processing device 20. The information processing device 20 includes a processor 110, a memory 120, an interface circuit 130, an input device 140 and a display device 150 connected to the interface circuit 130. The printer 10, the spectral reflectance measuring device 30, and the reflectance distribution measuring device 40 are also connected to the interface circuit 130. The processor 110 not only has a function of executing processing described in detail below, but also has a function of displaying data on the display device 150, obtained by the processing and data generated in the course of the processing.

The processor 110 operates to realize each of the functions of a print processing section 112, a print setting creation section 114, a learning processing section 116, and a medium specification processing section 118. The print processing section 112 executes a print process using the printer 10. The print setting creation section 114 creates print settings suitable for the type of the print medium PM. The medium specification processing section 118 executes medium specification process for specifying the type of the print medium PM. The functions of the sections 112, 114, 116, and 118 are realized by the processor 110 executing a computer program stored in the memory 120. However, the functions of the sections 112, 114, 116, and 118 may be realized by hardware circuitry. The "processor" of the present disclosure is a term that also includes such hardware circuitry. Further, the processor for executing various processes may be a processor included in a remote computer connected to the information processing device 20 via a network.

The memory 120 stores a discrimination function 201, a training data group TD1, a medium identifier list IDL, a known feature spectrum group KS1, and a print setting table PST. The discrimination function 201 is used for a process of acquiring discrimination information for discriminating the type of the print medium in accordance with the spectral reflectance $R1(\lambda)$ as the first physical property information. A configuration example and operation of the discrimination function 201 will be described later. The training data group TD1 is a set of labeled data used for learning of the discrimination function 201. The medium identifier list IDL is a list in which a medium identifier and physical property information are registered for each type of print medium. The known feature spectrum group KS1 is a set of feature spectra obtained when the training data is input again to the learned discrimination function 201. The feature spectrum will be described later. The print setting table PST is a table in which the print settings suitable for the type of print medium are registered.

Figure 3:
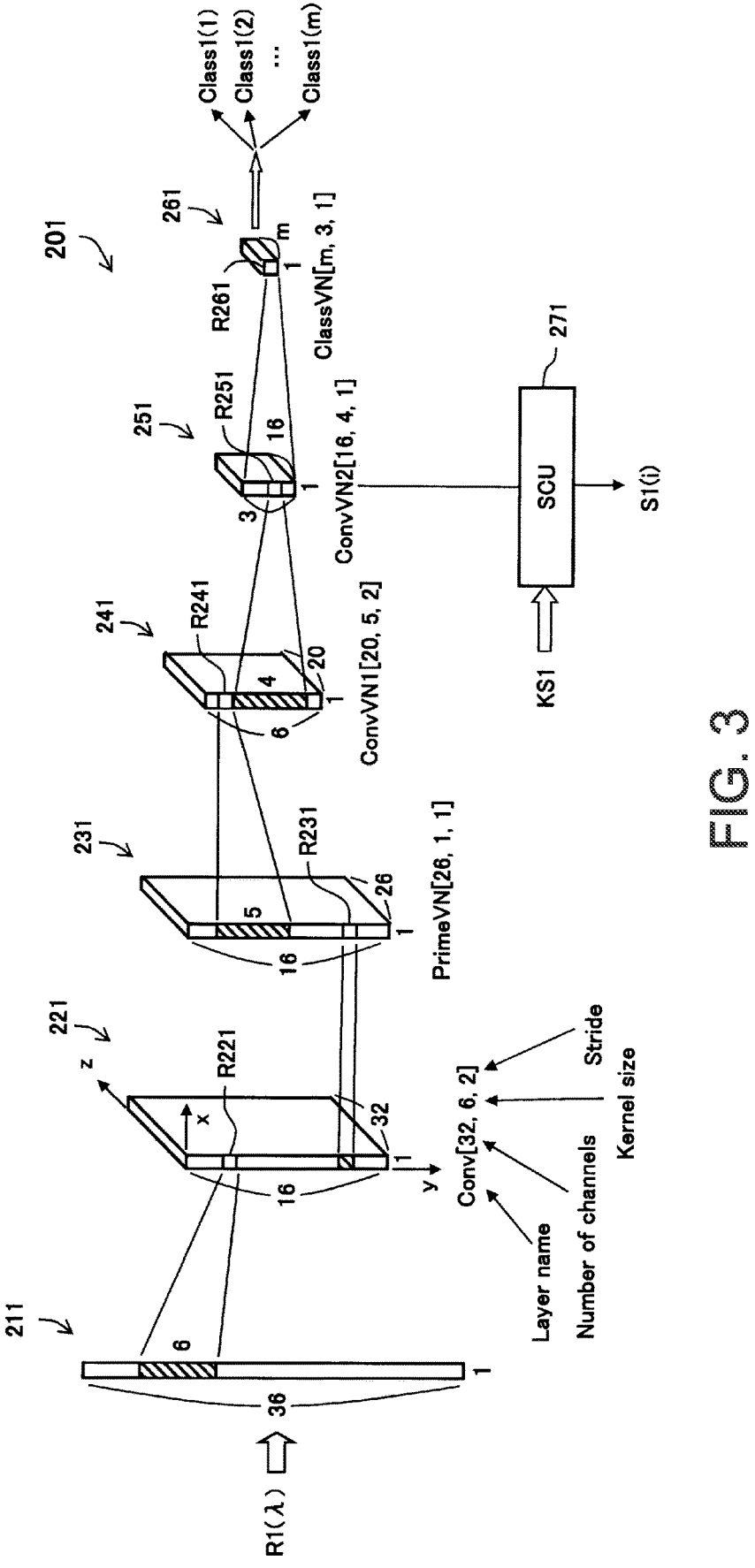
FIG. 3 is an explanatory diagram showing a configuration of a discrimination function.

FIG. 3 is an explanatory diagram showing the configuration of the discrimination function 201. The discrimination function 201 is a vector neural network providing a convolutional layer 221 as an intermediate layer, a primary vector neuron layer 231, a first convolutional vector neuron layer 241, and a second convolutional vector neuron layer 251, and a classification vector neuron layer 261 as an outputting layer, in this order from an input layer 211 to which the spectral reflectance $R1(\lambda)$ is input. Of these six layers 211 to 261, the input layer 211 is the lowest layer and the classification vector neuron layer 261 is the highest layer. In the following description, the layers 221 to 261 are also referred to as "Conv-layer 221", "PrimeVN-layer 231", "ConvVN1-layer 241", "ConvVN2-layer 251", and "ClassVN-layer 261", respectively.

In the present embodiment, input data to the input layer 211 is the spectral reflectance $R1(\lambda)$ and is one dimensional array data. For example, the spectral reflectance $R1(\lambda)$ is data obtained by extracting 36 representative values every 10 nm from data in the range of 380 nm to 730 nm.

The configuration of layers 221 to 261 can be described as follows.

Description of Configuration of Discrimination Function 201

Conv-layer 221: Conv[32, 6, 2]
    PrimeVN-layer 231: PrimeVN[26, 1, 1]
    ConvVN1-layer 241: ConvVN1[20, 5, 2]
    ConvVN2-layer 251: ConvVN2 [16, 4, 1]
    ClassVN-layer 261: ClassVN[n1+1, 3, 1]
    Vector dimension VD: VD=16

In the description of these layers 221 to 261, a character string before parentheses is a layer name, and numbers in parentheses are the number of channels, a kernel size, and a stride in this order. For example, the layer name of the Conv-layer 221 is "Conv", the number of channels is 32, the kernel size is 1×6, and the stride is 2. In FIG. 3, these descriptions are shown below each layer. A hatched rectangle drawn in each layer represents a kernel used when an output vector of an adjacent upper layer is calculated. In the present embodiment, since the input data is one dimensional array data, the kernel also has a one dimensional array. Note that the values of the parameters used in the description of the respective layers 221 to 261 are examples and can be arbitrarily changed.

The Conv-layer 221 is a layer composed of scalar neurons. The four layers 231 to 261 on the upper side thereof on the upper side are layers composed of vector neurons. A vector neuron is a neuron whose input and output are vectors. In the above description, the dimension of the output vector of an individual vector neuron is constant at 16. Hereinafter, the term "node" is used as a superordinate concept of the scalar neuron and the vector neuron.

In FIG. 3, for the Conv-layer 221, a first axis x and a second axis y defining plane coordinates of a node array, and a third axis z representing depth are shown. It is also shown that the size of the Conv-layer 221 in the x, y, and z directions are 1, 16, and 32, respectively. The size in the x direction and the size in the y direction are referred to as "resolution". In the present embodiment, the resolution in the x direction is always 1. The size in the z direction is the number of channels. These three axes x, y, and z are also used as coordinate axes indicating the position of each node in other layers. However, in FIG. 3, these axes x, y, and z are not shown in layers other than the Conv-layer 221.

As is well known, a resolution W1 in the y direction after convolution is given by the following equation.

$$W1 = \text{Ceil}\{(W0 - Wk + 1)/S\} \tag{1}$$

Here, W0 is resolution before convolution, Wk is kernel size, S is stride, and Ceil{X} is a function for performing an operation of rounding up X after a decimal point.

The resolution of each layer shown in FIG. 3 is an example when the resolution of the input data in the y direction is 36, and the actual resolution of each layer is appropriately changed according to the size of the input data.

The ClassVN-layer 261 has m channels. From these channels, classification output values Class1(1) to Class1(m) for m classes are outputted. If the maximum value among these classification output values Class1(1) to Class1(m) is a predetermined threshold value or greater, it can be determined that the class associated with the maximum value is the class to which the input data belongs. On the other hand, when the maximum value among the classification output values Class1(1) to Class1(m) is less than the threshold value, it can be determined that the class of the input data is unknown. In general, m is an integer greater than or equal to 2 and is the number of known classes that can be classified using the discrimination function 201. It is also possible to determine the class of the input data using a class specific similarity S1(i) (to be described later), instead of the classification output values Class1(1) to Class1(m).

FIG. 3 also shows a partial region Rn in the layer 221, 231, 241, 251, and 261. The subscript "n" of the partial region Rn is the reference symbol of each layer. For example, the partial region R221 indicates the partial region in the Conv-layer 221. The "partial region Rn" is a region that is specified by a plane position (x, y) defined by the position of the first axis x and the position of the second axis y in each layer and includes a plurality of channels along the third axis z. The partial region Rn has dimensions of "Width"×"Height"×"Depth" corresponding to the first axis x, the second axis y, and the third axis z, respectively. In the present embodiment, the number of nodes included in one "partial region Rn" is the "1×1×depth number", that is, the "1×1×channel number".

The discrimination function 201 further includes a similarity calculation section 271 that calculates the similarity S1(i). The similarity calculation section 271 calculates a feature spectrum (to be described later) from the output of the ConvVN2-layer 251, and calculates the similarity S1(i) for each class by using the feature spectrum. Here, i is a parameter indicating the class and takes a value of 1 to m.

In the present disclosure, a vector neuron layer used for calculating the degree of similarity S1(i) is also referred to as a "specific layer". As the specific layer, the vector neuron layer other than the ConvVN2-layer 251 may be used, and an arbitrary number of one or more vector neuron layers may be used. The configuration of the feature spectrum and a method of calculating the similarity using the feature spectrum will be described later.

The vector neural network used in the present embodiment is configured based on the same principle as the vector neural network described in US2021/0374534 disclosed by the applicant of the present disclosure.

FIG. 4 is a flowchart showing a processing procedure of a preparation step of the discrimination function 201. The preparation process is, for example, a process executed by a manufacturer of the printer 10.

In step S10, the first physical property information and the second physical property information are acquired for each of a plurality of printing media. As described above, in the present embodiment, the first physical property information is the spectral reflectance R1(λ) and is measured using the spectral reflectance measuring device 30. The second physical property information is the reflectance distribution R2(θ) and is measured using the reflectance distribution measuring device 40. These measurements are desirably performed at multiple locations on the same print medium. In addition, it is desirable to perform data extension in consideration of variations in measurement results. Generally, the measurement results vary depending on a colorimetry date and a measuring device. The data extension, to simulate such variations, a process for generating a plurality of measurement results by giving random variations to the measurement results. Specifically, a plurality of spectral reflectance R1(λ) are created by giving random variations to the spectral reflectance R1(λ) obtained by one measurement. The same applies to the reflectance distribution R2(θ). The first physical property information acquired in step S10 is used as a training data group TD1.

In step S20, the medium identifier list IDL is created for a plurality of print medium. FIG. 5 is an explanatory diagram showing the medium identifier list IDL. In the medium identifier list IDL, the medium identifier given to each print medium, a medium name, a class number, a data sub-number, and the representative data of the first physical property information and the second physical property information are registered. In this example, the medium identifiers "A-1" to "A-m" are given to m print medium. The medium name is a name of the print medium displayed in a window for a user to set a print condition. The data sub-number is a number for distinguishing a plurality of data of physical property information relating to the same print medium. In this example, three spectral reflectance R1(λ) are registered as the first physical property information, and three reflectance distribution R2(θ) are registered as the second physical property information, for the respective print medium. However, the number of data of the physical property information of each print medium may be different. As the first physical property information and the second physical property information of each print medium, respectively, one or more pieces of data may be registered, but a plurality of pieces of data are desirably registered. The medium identifier list IDL may be configured not to include the first physical property information and the second physical property information.

In step S30 of FIG. 4, the print settings are created for a plurality of print medium, and the print setting creation section 114 registers the print settings in the print setting table PST. FIG. 6 is an explanatory diagram showing the print setting table PST. In each record of the print setting table PST, the medium identifier and the print settings are registered for each print medium. In this example, printer profiles PR1 to PRm, medium feed speeds FS1 to FSm, and drying times DT1 to DTm are registered as the print settings. The printer profiles PR1 to PRm are output color profiles of the printer 10, and are created for each print medium.

Specifically, it is possible to create the printer profiles by printing a test chart without color correction on the print medium using the printer 10, performing spectral measurement on the test chart using the spectral reflectance measuring device 30, and processing spectral measurement result by the print setting creation section 114. The medium feed speeds FS1 to FSm and the drying times DT1 to DTm can also be decided experimentally, respectively. The term "drying time" refers to a time for drying the print medium after printing in a dryer (not shown) in the printer 10. In a printer of a type that dries the print medium after printing by blowing air, the "drying time" is an air blowing time. In a printer without the dryer, the "drying time" is a waiting time for natural drying. Although other initial items may be set as the print setting, it is desirable to create the print setting including at least a printer profiles.

In step S40 of FIG. 4, the user sets parameters of the discrimination function 201. In step S50, the learning processing section 116 executes learning of the discrimination function 201 using the training data group TD1. The training data group TD1 is a set of labeled spectral reflectance R1(λ) relating to m types of the print medium. The spectral reflectance R1(λ) is measured in an unprinted area. When learning is completed, the learned discrimination function 201 is stored in the memory 120.

In step S60, the learning processing section 116 inputs the training data group TD1 to the learned discrimination function 201 again to generate the known feature spectrum group KS1. The known feature spectrum group KS1 is a set of the feature spectrum described below.

Figures 7, 8:
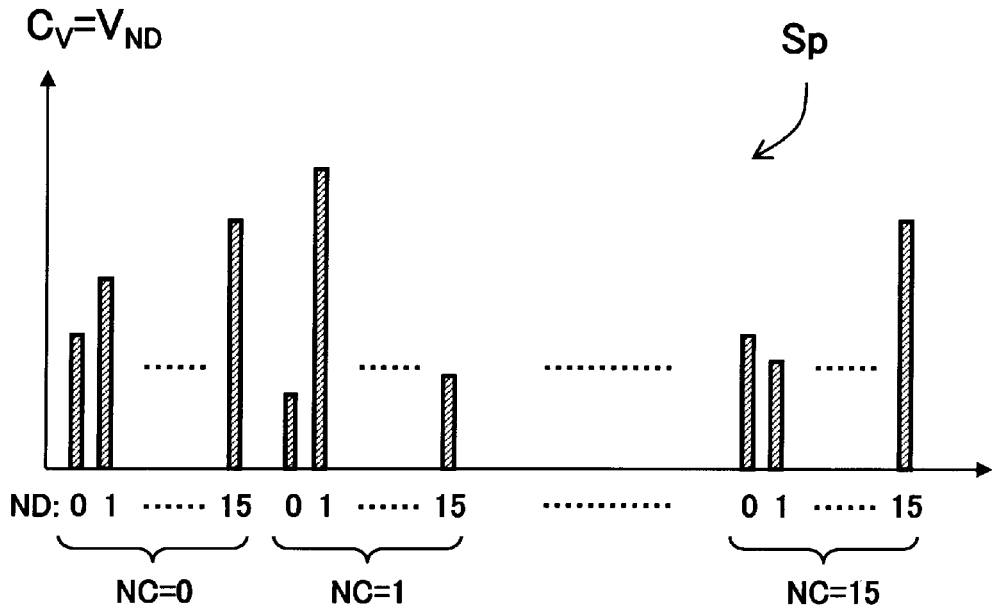
FIG. 7 is an explanatory diagram showing a feature spectrum.
FIG. 8 is an explanatory diagram showing a configuration of a known feature spectrum group.

FIG. 7 is an explanatory diagram showing a feature spectrum Sp obtained by inputting arbitrary input data to the learned discrimination function 201. Here, the feature spectrum Sp obtained from the output of the ConvVN2-layer 251 will be described. The horizontal axis of FIG. 7 is a spectral position represented by a combination of an element number ND and a channel number NC of an output vector of the node at one plane position (x, y) of the ConvVN2-layer 251. In the present embodiment, since the vector dimension of the node is 16, the element number ND of the output vector is 16 pieces from 0 to 15. Since the number of channels in the ConvVN2-layer 251 is 16, the channel number NC is 16 pieces from 0 to 15.

The vertical axis in FIG. 7 indicates a feature value Cv at each spectral position. In this example, the feature value Cv is a value VND of each element of the output vector. As the feature value Cv, a value obtained by multiplying a value VND of each element of the output vector and an activation value may be used, or the activation value may be used as it is. In the latter case, the number of feature values Cv included in the feature spectrum Sp is equal to the number of channels and is 16 pieces. Note that the activation value is a value corresponding to the vector length of the output vector of the node.

Since the number of the feature spectrum Sp obtained from the output of the ConvVN2-layer 251 for one input data is equal to the number of plane positions (x, y) of the ConvVN2-layer 251, 1×3=3 pieces.

The similarity calculation section 271 inputs the training data to the learned discrimination function 201 again, calculates the feature spectrum Sp shown in FIG. 7, and registers it in the known feature spectrum group KS1.

FIG. 8 is an explanatory diagram showing the configuration of the known feature spectrum group KS1. Each record of the known feature spectrum group KS1 includes a record number, the layer name, a label Lb, and a known feature spectrum KSp. The known feature spectrum KSp is the same as the feature spectrum Sp in FIG. 7 obtained in accordance with input of the training data. In the example of FIG. 8, the known feature spectrum KSp associated with the value of each label Lb is generated from the output of the ConvVN2-layer 251 obtained when the training data group TD1 is input to the learned discrimination function 201, and is registered. For example, 1_max known feature spectrum KSp are registered in association with the label Lb=1, 2_max known feature spectrum KSp are registered in association with the label Lb=2, and m_max known feature spectrum KSp are registered in association with the label Lb=m. The 1_max, 2_max, and m_max are integers equal to or greater than 2, respectively. As described above, each label Lb correspond to different known class each other. Therefore, it can be understood that each known feature spectrum KSp in the known feature spectrum group KS1 is registered in association with one class of the m known classes.

The training data group used in step S60 need not be the same as the plurality of training data groups TD1 used in step S50. However, also in step S60, if some or all of the plurality of training data groups TD1 used in step S50 are used, there is an advantage that it is not necessary to prepare new training data.

Figure 9:
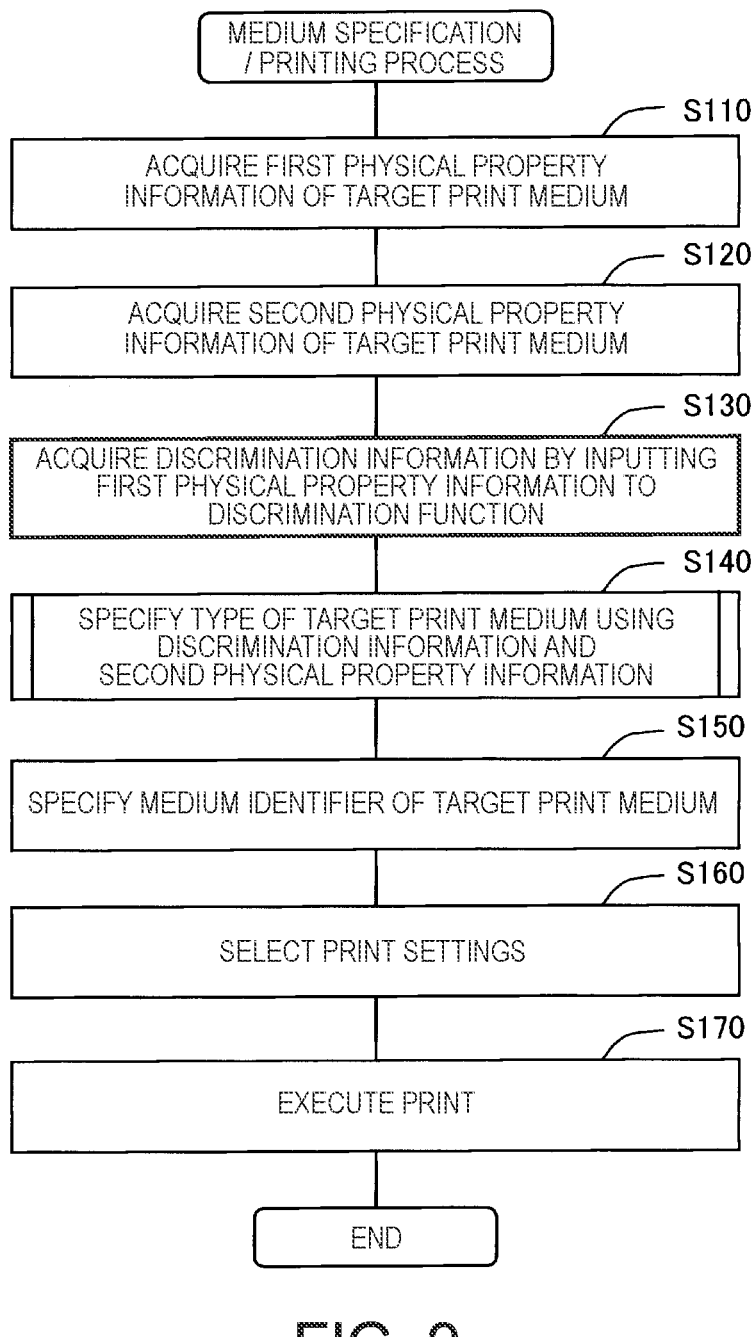
FIG. 9 is a flowchart showing a processing procedure of a medium specification/printing process.

FIG. 9 is a flowchart illustrating a processing procedure of a medium specification/printing process using the learned discrimination function 201. The medium specification/printing process is executed by, for example, the user who uses the printer 10.

In step S110, the medium specification processing section 118 acquires the first physical property information of a target print medium, which is the print medium as a processing target, and in step S120, acquires the second physical property information. As described above, in the present embodiment, the first physical property information is the spectral reflectance R1(λ) of the unprinted area, and the second physical property information is the reflectance distribution R2(θ) of the unprinted area.

In step S130, the medium specification processing section 118 inputs the first physical property information of the target print medium to the learned discrimination function 201, and acquires discrimination information. As the discrimination information, any one of a similarity S1(i) for each class calculated by the similarity calculation section 271 and a classification output value Class1(i) output from the ClassVN-layer 261 as an output layer can be used. This point will be described later.

In step S140, the medium specification processing section 118 specifies the type of the target print medium using the discrimination information obtained in step S130 and the second physical property information obtained in step S120.

Figure 10:
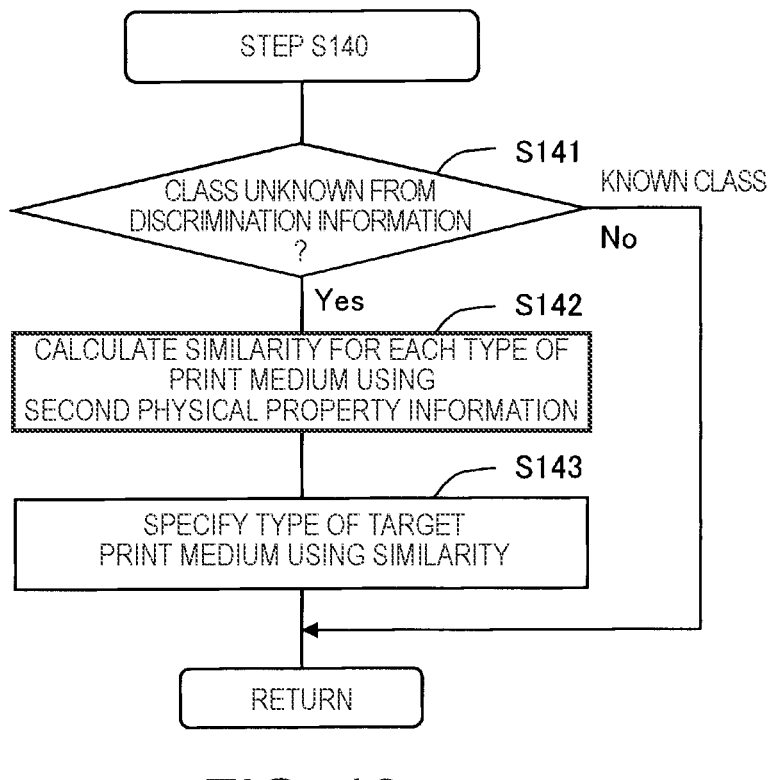
FIG. 10 is a flowchart illustrating a processing procedure of step S140 of a first embodiment.

FIG. 10 is a flowchart showing the processing procedure of step S140 in a first embodiment. In step S141, the medium specification processing section 118 determines whether the class discriminated by the discrimination information is a known class or an unknown class. As described above, either the similarity S1(i) for each class or the classification output value Class1(i) can be used as the discrimination information.

The similarity S1(i) for each class as discrimination information can be calculated using, for example, the following equation.

$$S1(i) = \max[G\{Sp(x,y), KSp(i)\}] \qquad (2)$$

Here, i is an ordinal number with respect to a plurality of classes, G{a, b} is a function for obtaining similarity between a and b, Sp(x, y) is a feature spectrum at all plane positions (x, y) obtained according to input data, KSp(i) is all known feature spectrum associated with a specific class i, and max [X] is a logical operation taking a maximum value of X. As the function G{a, b} for obtaining the similarity, for example, an equation for obtaining a cosine similarity or an equation for obtaining the similarity according to a distance can be used.

The similarity S1(i) is the maximum value among similarities calculated between each of the feature spectrum Sp(x, y) at all plane positions (x, y) of the ConvVN2-layer 251 and each of all known feature spectrum KSp(i) corresponding to a specific class i. Such similarity S1(i) is obtained for each of m classes i corresponding to m labels Lb. The similarity S1(i) represents the degree to which the first physical property information of the target print medium is similar to the first physical property information of each class.

As a method for discriminating the class of the target print medium using the discrimination information, for example, any one of the following methods can be adopted.

Discrimination Method D1

(i) When the maximum value of the similarity S1(i) is equal to or greater than a predetermined determination threshold value, the known class corresponding to the maximum value is discriminated as the class of the target print medium, and (ii) When the maximum value of the similarity S1(i) is less than the determination threshold value, discriminated that the class of the target print medium is unknown.

Discrimination Method D2

(i) When the maximum value of the classification output value Class1(i) is equal to or greater than the predetermined determination threshold value, the known class corresponding to the maximum value is discriminated as the class of the target print medium, and (ii) When the maximum value of the classification output value Class1(i) is less than the determination threshold value, discriminated that the class of the target print medium is unknown.

Discrimination Method D3

(i) When the known classes discriminated by the above described discrimination methods D1 and D2 coincide with each other, the known class is discriminated to be the class of the target print medium, and (ii) When the known classes discriminated by the above described discrimination methods D1 and D2 do not coincide or when the class is discriminated as the unknown by at least one of the discrimination methods D1 or D2, discriminated that the class of the target print medium is unknown.

According to the discrimination methods D1 to D3, the class of the target print medium can be discriminated using the discrimination information. Particularly, the method using the similarity S1(i) as in the discrimination methods D1 and D3 is desirable in that a discrimination accuracy can be further enhanced.

In step S141, when it is determined that the class of the target print medium is known in accordance with the discrimination information, the type of the target print medium is specified in accordance with the known class, and ends the process of FIG. 10. On the other hand, when it is determined that the class of the target print medium is unknown, the process advances to step S142.

In step S142, the medium specification processing section 118 calculates the similarity S2(i) for each type of print medium using the reflectance distribution R2(θ) as the second physical property information. The similarity S2(i) can be calculated by using, for example, following equation.

$$S2(i)=\max[G\{R2(\theta),KR2(i)\}] \tag{3}$$

Here, i is an ordinal number with respect to the type of print medium, G{a, b} is the function for obtaining similarity between a and b, KR2(i) is the representative reflectance distribution associated with the type of print medium i, and max [X] is a logical operation for taking the maximum value of X. As the function G{a, b} for obtaining the similarity, for example, an equation for obtaining a cosine similarity or an equation for obtaining the similarity according to a distance can be used. As the representative reflectance distribution KR2(i), for example, a representative data of the reflectance distribution R2(0) registered in the medium identifier list IDL shown in FIG. 5 can be used.

When two or more kinds of information represented by one value such as the thickness, the amount of water, the weight, the friction coefficient, or the like are used as the second physical property information, the similarity S2(i) described above can be calculated by regarding an array of the values as the vector. When only one type of information represented by one value, such as the thicknesses, the amount of water, the weight, the friction coefficient, or the like is used as the second physical property information, the similarity S2(i) may be calculated according to the following equation according to the absolute difference 5 between the value V and the representative value Vrep obtained in advance.

$$S2(i)=(1-\delta)/V\text{rep} \tag{4a}$$

$$\delta=|V-V\text{rep}| \tag{4b}$$

In step S143, the medium specification processing section 118 specifies the type of the target print medium using the similarity S2(i) obtained from the second physical property information. That is, when the maximum value of the similarity S2(i) is equal to or greater than the predetermined threshold value, the type corresponding to the maximum value is specified as the type of the target print medium. On the other hand, when the maximum value of the similarity S2(i) is less than the threshold value, specified that the type of the target print medium is unknown.

When the type of the target print medium is specified in this way, in step S150 of FIG. 9, the medium specification processing section 118 discriminated the medium identifier according to the type of the specified target print medium. This process is performed by referring to, for example, the medium identifier list IDL shown in FIG. 5. In step S160, the print processing section 112 selects the print setting according to the medium identifier. This process is performed by referring to the print setting table PST shown in FIG. 6. In step S170, the print processing section 112 executes the print according to the print setting. In step S140, when it is determined that the type of the target print medium is unknown, ends the process of FIG. 9 without performing the processing in step S150 and subsequent steps.

As described above, in the first embodiment, since the type of the target print medium is specified by using the discrimination information obtained by inputting the first physical property information of the target print medium to the discrimination function 201 and the second physical property information not used for machine learning, it is possible to prevent the discrimination function from taking a long time to learn. In addition, the type of the print medium can be specified with high accuracy using the first physical property information and the second physical property information.

Figure 11:
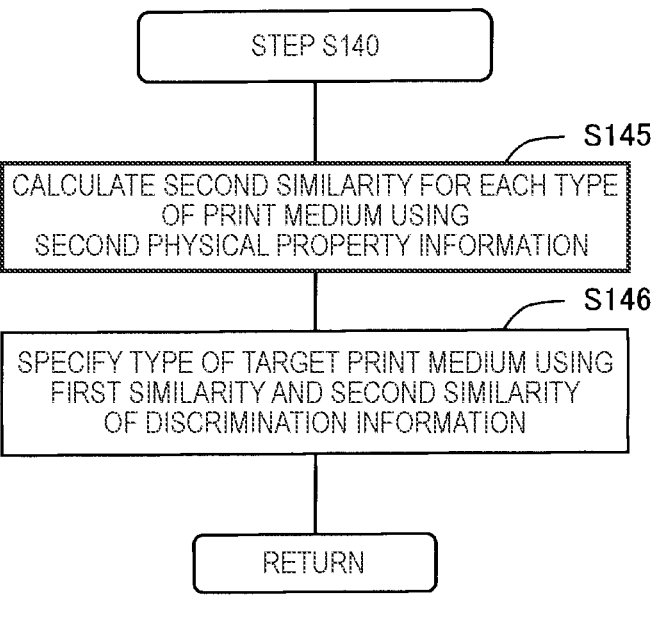
FIG. 11 is a flowchart illustrating a processing procedure of step S140 of the second embodiment.

FIG. 11 is a flowchart showing the processing procedure of step S140 in a second embodiment. In the second embodiment, the configuration of the device, and the processing procedure shown in FIGS. 4 and 9 are same as the first embodiment and the only difference from the first embodiment is the detailed procedure of step S140 shown in FIG. 11.

In step S145, the medium specification processing section 118 calculates a second similarity S2(i) for each type of print medium by using the second physical property information. The second similarity S2(i) is the same as the similarity S2(i) calculated in step S142 of the first embodiment.

In step S145, the medium specification processing section 118 specifies the type of the target print medium by using first similarity S1(i) and the second similarity S2(i) included in the discrimination information obtained in step S130 of FIG. 9.

As a method of specifying the type of the target print medium using the first similarity S1(i) and the second similarity S2(i), for example, any one of the following methods can be adopted.

Specification Method M1

When the maximum value of the integrated determination value Sa(i) for each type given by the following equation is not less than the predetermined determination threshold value, the type corresponding to the maximum value is specified as the type of the target print medium.

$$Sa(i)=c1 \times S1(i)+c2 \times S2(i) \tag{5a}$$

Here, i is an ordinal number indicating the type of print medium, and c1 and c2 are different weights, which are not 0. The integrated determination value Sa(i) is a value obtained by adding the first similarity S1(i) and the second similarity S2(i) using different weights. When the maximum value of the integrated determination value Sa(i) is less than the determination threshold value, determined that the type of the target print medium is unknown. According to the specification method M1, the type of the target print medium can be accurately specified using the two similarity S1 (i) and S2(i).

The weights c1 and c2 in the above equation (5a) may be equal to each other. However, if these weights c1 and c2 are set to different values, since different weights are used for the two similarity S1(i) and S2(i), there is a possibility that the type of print medium can be specified more accurately according to the two types of characteristic information.

Specification Method M2

When an integrated determination value Sb given by the following equation is not less than the predetermined determination threshold value, the type corresponding to the integrated determination value Sb is specified as the type of the target print medium.

$$Sb=\max[S1(i),S2(i)] \tag{5b}$$

The integrated determination value Sb is the maximum value among the two similarity S1(i) and S2(i). When the integrated determination value Sb is less than the determination threshold value, it is determined that the type of the target print medium is unknown. Even when the specification method M2 is used, the type of the target print medium can be accurately specified using the two similarity S1(i) and S2(i).

The second embodiment also provides substantially the same effect as that of the first embodiment described above. That is, it is possible to prevent a lot of time from being taken for learning of the discrimination function. In addition, the type of the print medium can be specified with high accuracy using the first physical property information and the second physical property information.

As several examples, when two types of print medium, black medium and silver medium having specular gloss, were specified according to the first embodiment and the second embodiment using the spectral reflectance R1($\lambda$) as the first physical property information and the reflectance distribution R2($\theta$) as the second physical property information, both medium could be distinguished and specified with high accuracy. On the other hand, when discrimination is performed using only the discrimination function 201, there is a case where black medium and silver medium having specular gloss cannot be distinguished and specified. It is presumed that the reason for this is because both the black medium and the silver medium with specular gloss have small diffuse reflection components.

In the above described embodiment, the discrimination function 201 is configured using the vector neural network disclosed in US2021/0374534, but instead of this, a capsule network disclosed in U.S. Pat. No. 5,210,798 or WO 2019/083553 may be used. In addition, instead of the vector neural network, a convolutional neural network using scalar neurons may be used to configured the discrimination function 201. Alternatively, the discrimination function 201 may be configured using another type of machine learning model such as a support vector machine, a decision tree, or the like.

OTHER EMBODIMENTS

The present disclosure is not limited to the embodiments described above, and can be realized in various forms without departing from the scope thereof. For example, the present disclosure can also be realized by the following aspects. The technical features in the above described embodiments corresponding to the technical features in each aspect described below can be appropriately replaced or combined in order to solve a part or all of the problems of the present disclosure or to achieve a part or all of the effects of the present disclosure. In addition, unless the technical features are described as essential features in the present specification, the technical features can be appropriately deleted.

(1) According to a first aspect of the present disclosure, a print medium specification method for specifying type of a print medium includes (a) step for acquiring first physical property information related to the print medium; (b) step for acquiring second physical property information different from the first physical property information related to the print medium; (c) step for acquiring discrimination information for discriminating the type of the print medium by inputting the first physical property information to a discrimination function configured as a learned machine learning model; and (d) step for specifying a type of the print medium using the discrimination information and the second physical property information not used for machine learning.

According to this method, since the first physical property information is used in the discrimination function but the second physical property information is not used, it is possible to prevent a lot of time from being taken for learning of the discrimination function. In addition, the type of the print medium can be specified with high accuracy using the first physical property information and the second physical property information.

(2) In the above described print medium specification method, wherein step (d) may include step for calculating a similarity for each type of the print medium using the second physical property information when the discrimination information indicates that the type of the print medium is undetermined and step for specifying the type of the print medium by using the similarity.

According to this method, when cannot discrimination by the discrimination function, the type of the print medium can be specified by using the similarity for each type of the print medium calculated by using the second physical property information.

(3) In the above described print medium specification method, wherein the discrimination information includes a first similarity for each type of the print medium and step (d) may include step for calculating a second similarity for each type of the print medium by using the second physical property information and step for specifying a type of the print medium by using the first similarity and the second similarity.

According to this method, it is possible to accurately specify the type of the print medium using the first similarity for each type of the print medium.

(4) In the above described print medium specification method, wherein the discrimination function may include a vector neural network having a plurality of vector neuron layers, and is configured so that a plurality of types of the print medium are divided into a plurality of classes and the first similarity may be a similarity for each class calculated between a feature spectrum obtained from an output of a specific layer of the machine learning model and a known feature spectrum group created in advance in association with the plurality of classes.

According to this method, it is possible to appropriately calculate the first similarity for each type of print medium.

(5) In the above described print medium specification method, wherein the specific layer may have a configuration in which vector neuron disposed on a plane defined by two axes of a first axis and a second axis is disposed as a plurality of channels along a third axis in a direction different from the two axes and the feature spectrum is may be any one of the following (i) a first type of feature spectrum in which a plurality of element values of an output vector of a vector neuron at one plane position in the specific layers are arranged across the plurality of channels along the third axis, (ii) a second type of feature spectrum obtained by multiplying each element value of the first type of feature spectrum by an activation value corresponding to a vector length of the output vector, and (iii) a third type of feature spectrum in which the activation values at one plane position in the specific layers are arranged across the plurality of channels along the third axis.

According to this method, the feature spectrum can be easily obtained.

(6) In the above described print medium specification method, wherein the first physical property information and the second physical property information may include at least one of a spectral reflectance, a spectral transmittance, a reflectance distribution, a captured image captured by a visible light camera, a thickness, an amount of water, a weight, a friction coefficient, and an ultrasonic inspection image.

According to this method, the type of print medium can be specified by using any one of various types of physical property information relating to the print medium.

(7) In the above described print medium specification method, wherein the first physical property information is a spectral reflectance and the second physical property information may be the reflectance distribution including reflectance at a plurality of reflection angles with respect to one or more incident angle.

According to this method, it is possible to specify the type of print medium, which cannot be specified only by the spectral reflectance or the reflectance distribution, by using both of them.

(8) According to a second aspect of the present disclosure, a print medium specification system for executes medium specification process for specifying a type of a print medium includes a memory configured to store a discrimination function configured as a learned machine learning model and a processor configured to execute the medium specification process by using the discrimination function, wherein (a) process for acquiring first physical property information related to the print medium, (b) process for acquiring second physical property information different from the first physical property information related to the print medium, (c) process for inputting the first physical property information to the discrimination function to acquire discrimination information for discriminating a type of the print medium, (d) process for specifying the type of the print medium by using the discrimination information and the second physical property information, which is not used in machine learning.

The present disclosure can also be realized in various forms other than the above described. For example, it can be realized in the form of a computer program for realizing the functions of the print medium specifying system, a non-transitory storage medium storing the computer program, or the like.

What is claimed is:

1. A print medium specification method for specifying a type of a print medium, the method comprising:

(a) acquiring first physical property information related to the print medium;

(b) acquiring second physical property information different from the first physical property information related to the print medium, the second physical property information having a value for at least one type of information that is not included within the first physical property information, or the first physical property information having a value for at least one type of information that is not included within the second physical property information;

(c) acquiring discrimination information for discriminating the type of the print medium by inputting the first physical property information to a discrimination function configured as a learned machine learning model; and (d) specifying a type of the print medium using the discrimination information and the second physical property information not used for machine learning.

2. The print medium specification method according to claim 1, wherein the specifying includes calculating a similarity for each type of the print medium using the second physical property information when the discrimination information indicates that the type of the print medium is undetermined and specifying the type of the print medium by using the similarity.

3. The print medium specification method according to claim 1, wherein the discrimination information includes a first similarity for each type of the print medium and the specifying includes

15 calculating a second similarity for each type of the print medium by using the second physical property information and specifying a type of the print medium by using the first similarity and the second similarity.

4. The print medium specification method according to claim 1, wherein the first physical property information and the second physical property information include at least one of a spectral reflectance, a spectral transmittance, a reflectance distribution, a captured image captured by a visible light camera, a thickness, an amount of water, a weight, a friction coefficient, and an ultrasonic inspection image.

5. The print medium specification method according to claim 4, wherein the first physical property information is a spectral reflectance and the second physical property information is the reflectance distribution including reflectance at a plurality of reflection angles with respect to one or more incident angle.

6. A print medium specification method for specifying a type of a print medium, the method comprising:

(a) acquiring first physical property information related to the print medium;

(b) acquiring second physical property information different from the first physical property information related to the print medium;

(c) acquiring discrimination information for discriminating the type of the print medium by inputting the first physical property information to a discrimination function configured as a learned machine learning model; and (d) specifying a type of the print medium using the discrimination information and the second physical property information not used for machine learning, wherein the discrimination information includes a first similarity for each type of the print medium, the specifying includes calculating a second similarity for each type of the print medium by using the second physical property information, and specifying a type of the print medium by using the first similarity and the second similarity, the discrimination function includes a vector neural network having a plurality of vector neuron layers, and is configured so that a plurality of types of the print medium are divided into a plurality of classes, and the first similarity is a similarity for each class calculated between a feature spectrum obtained from an output of a specific layer of the machine learning model and a known feature spectrum group created in advance in association with the plurality of classes.

7. The print medium specification method according to claim 6, wherein the specific layer has a configuration in which vector neuron disposed on a plane defined by two axes of a first axis and a second axis is disposed as a plurality of channels along a third axis in a direction different from the two axes and the feature spectrum is any one of the following:

(i) a first type of feature spectrum in which a plurality of element values of an output vector of a vector neuron at one plane position in the specific layers are arranged across the plurality of channels along the third axis, (ii) a second type of feature spectrum obtained by multiplying each element value of the first type of feature spectrum by an activation value corresponding to a vector length of the output vector, and (iii) a third type of feature spectrum in which the activation values at one plane position in the specific layers are arranged across the plurality of channels along the third axis.

8. A print medium specification system for executes medium specification process for specifying a type of a print medium comprising:

a memory configured to store a discrimination function configured as a learned machine learning model and a processor configured to execute the medium specification process by using the discrimination function, wherein the processor is configured to perform the following process:

(a) process for acquiring first physical property information related to the print medium, (b) process for acquiring second physical property information different from the first physical property information related to the print medium, the second physical property information having a value for at least one type of information that is not included within the first physical property information, or the first physical property information having a value for at least one type of information that is not included within the second physical property information, (c) process for inputting the first physical property information to the discrimination function to acquire discrimination information for discriminating a type of the print medium, (d) process for specifying the type of the print medium by using the discrimination information and the second physical property information, which is not used in machine learning.

* * * * *